March 2, 1971     F. N. H. JOHNSTONE     3,566,480
KILNS

Filed April 26, 1968     4 Sheets-Sheet 1

FREDERICK NOEL HOPE JOHNSTONE
*Inventor*

Attorneys

March 2, 1971  F. N. H. JOHNSTONE  3,566,480
KILNS

Filed April 26, 1968  4 Sheets-Sheet 2

FREDERICK NOEL HOPE JOHNSTONE
Inventor

By Wendroth.
Lind & Ponack  Attorneys

FREDERICK NOEL HOPE JOHNSTONE,
Inventor

United States Patent Office 3,566,480
Patented Mar. 2, 1971

3,566,480
KILNS
Frederick Noel Hope Johnstone, St. Anne's Lodge,
St. Anne's Road, Avondale, Salisbury, Rhodesia
Filed Apr. 26, 1968, Ser. No. 724,456
Claims priority, application Rhodesia, May 1, 1967,
178/67
Int. Cl. F26b *19/00*
U.S. Cl. 34—219          2 Claims

ABSTRACT OF THE DISCLOSURE

A portable kiln having a self-contained heat source and heating chamber with a generally aligned first and second portions. The first portion has an inlet port for ambient air and an outlet. A first heat exchanger element is adjacent the inlet with a duct enclosing the first heater element and leading from the inlet to the outlet. A fan is in the duct. The second portion has an inlet for the heated air from the fan. A drying chamber below the first and second portions has a second heat exchanger element adjacent thereto and a half-venturi type duct leading from the fan to the second heat exchange element so that heated air from the fan passes over the second heat exchanger element to produce a constant velocity airstream in the drying chamber. An adjustable outlet damper is provided adjacent the drying chamber and a duct connecting the drying chamber with the inlet of the first portion of the heating chambers, as well as with the exterior of the kiln, to selectively adjust the amount of air being recirculated and exhausted.

---

This invention relates to improvements in kilns and particularly to kilns of the type used for the drying of fish, meat and various food products.

It is an object of the invention to provide a kiln of the kind in question which may be set up on a trailer unit and become entirely self-contained and therefore portable from site to site. Other objects of the invention will emerge from the description which follows.

According to the invention, a kiln characterised by a heat source comprising a fluid to be heated contained in a closed ciruit; at least one heat exchanger element within the kiln forming part of the closed circuit; heat generating means associated with the circuit, and means to recycle heated fluid.

Also according to the invention, the heat source forms part of the structure of the kiln.

In one form of the invention a kiln characterised by a heating chamber comprising two portions, the first portion including an inlet port for ambient air, at least one heat exchanger element adjacent the inlet; a duct enclosing the heater element and leading from the inlet to an outlet associated with a fan; the second portion comprising an inlet for heated air associated with the fan and a half-venturi type duct leading from the fan to a second heat exchanger element associated with the inlet to the drying chamber of the kiln; the arrangement being such that the heated air discharged from the fan passes over the second heat exchanger element in a manner adapted to produce a constant velocity airstream in the drying chamber.

Further according to the invention, a kiln characterised by a heating chamber comprising two portions, the first portion including an inlet port for ambient air, at least one heat exchanger element adjacent the inlet; a venturi type duct enclosing the heater element and leading from the inlet to an outlet associated with a fan; the second portion comprising an inlet associated with the fan and a half-venturi type duct leading to a drying chamber of the kiln; the arrangement being such that ambient air is drawn into the first portion and over the heat exchanger by the fan at a low relative velocity, the heated air then being speeded up by the venturi type duct and discharged into the second portion where it is constrained to form a constant velocity constant pressure airstream for introduction into the drying chamber.

In one form of the invention a kiln for use in reducing moisture content of materials includes a body portion comprising a first or upper chamber and a second or lower chamber; the upper chamber having an inlet port for ambient air in one wall thereof, and at least one heat exchanger element adjacent the inlet; a fan in the upper chamber to draw air over the element and to discharge heated air into the lower chamber; at least one heat exchanger element in the lower chamber and a re-cycle duct for air connecting the lower chamber to the upper chamber; the duct leading from a position downstream in the lower chamber to a position upstream in the upper chamber relative to the heat exchangers in each chamber; a damper to regulate the flow of air via the duct and an outlet for air in the lower chamber adapted to discharge to atmosphere such air as is not re-cycled; access doors in the lower chamber to allow charging of the kiln with materials to be dried and removal from the kiln of dried product; characterised in that the heat exchanger elements in each chamber form part of a closed circuit heated fluid system comprising a heat exchanger and at least one reservoir for fluid to be heated; at least one source of heat associated with the reservoir and means to recycle heated fluid in the system.

Still further according to the invention, a kiln for use in reducing moisture content of materials, of the foregoing character and further characterised in that the upper chamber comprises two portions, the first portion including an inlet port for air, a heat exchanger element adjacent the inlet port and a venturi-type duct enclosing the heater element and leading from the inlet to an outlet associated with the fan; the second portion comprising a half-venturi type duct leading from the fan to the lower chamber so as to ensure a constant velocity constant pressure airflow to the lower chamber.

In a further embodiment of the invention, a kiln for use in reducing moisture content of materials which includes a combination of the aforesaid characteristics as set forth in the preceding two paragraphs.

In order to illustrate the invention, an embodiment will be described in detail with reference to the accompanying drawings, in which.

Figure 1:
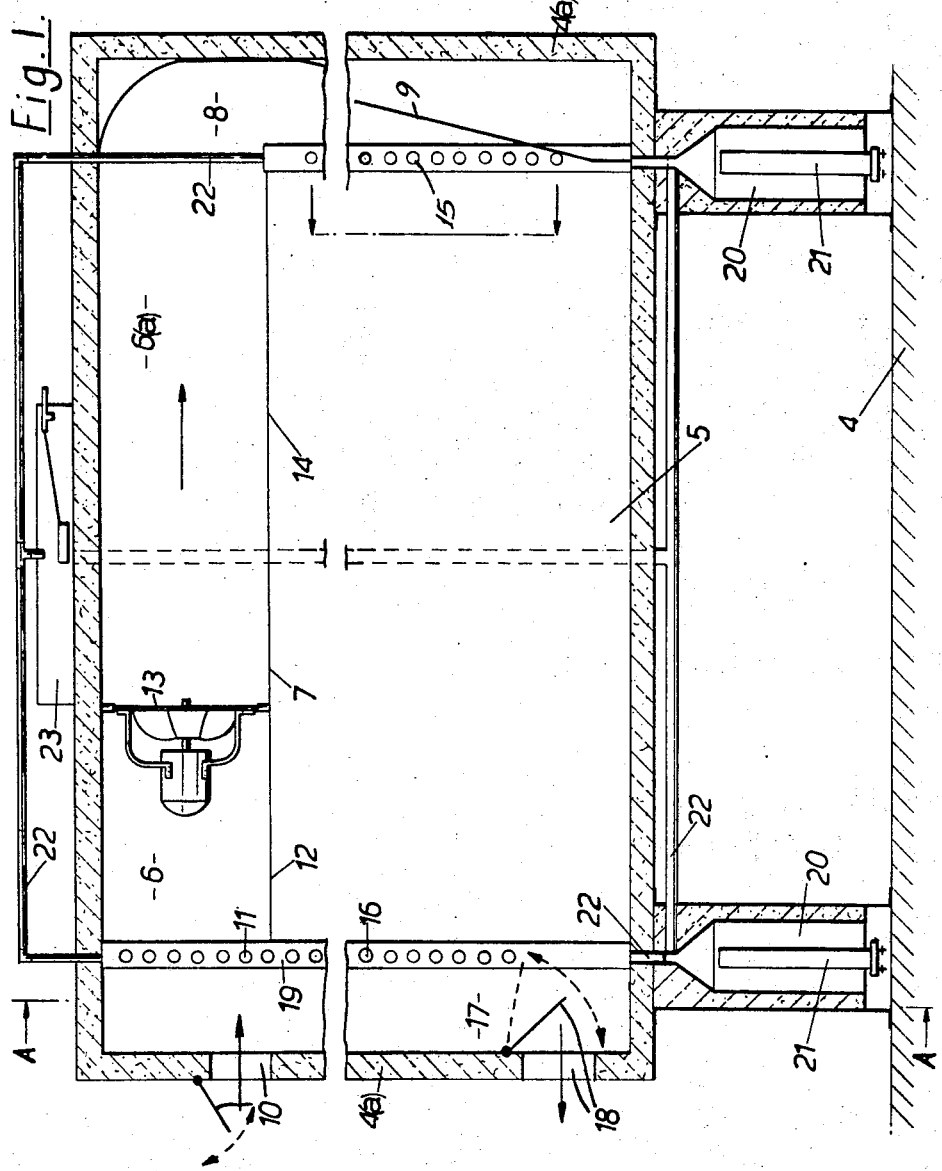
FIG. 1 illustrates a sectional side elevation.
Figure 2:
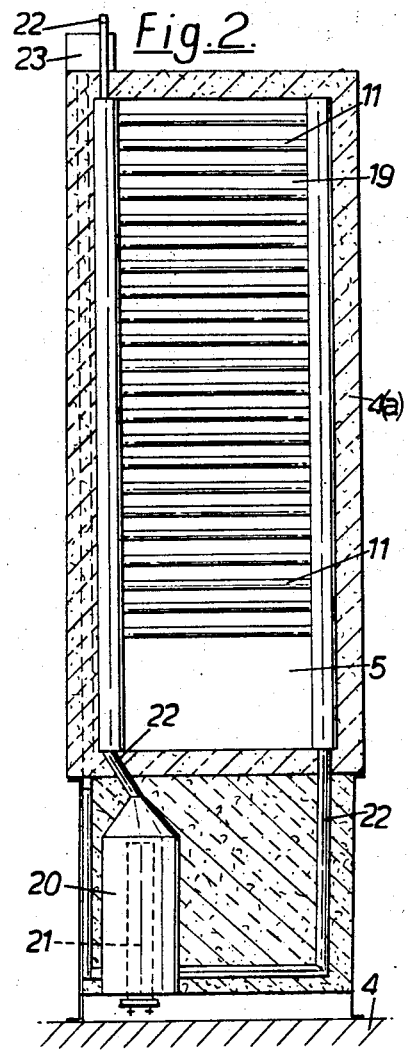
FIG. 2 illustrates an end elevation partly in section.

Referring to FIG. 1, numeral 4, illustrates a base for a kiln, and numeral 4(a) indicates the wall of a drying chamber 5, which has a heating chamber 6 and 6(a), superimposed thereon. Heating chamber 6 and 6(a), comprises two sections joined together by fan duct 7, and connected to drying chamber 5, by means of duct 8, and airstream divider 9.

First portion 6, of the heating chamber has an adjustable inlet 10, for ambient air which air is directed over heater elements 11. Thereafter it is drawn along duct 12, by fan 13. The air then passes along duct 14, of chamber 6(a), to passage 8. Airstream divider 9, spreads the air evenly in drying chamber 5. Subsidiary heater elements 15 and 16, spaced within drying chamber 5, compensate for any fall in temperature due to evaporation of moisture from materials to be dried in drying chamber 5.

To afford re-cycling, a duct member 17, is provided in an end wall of the kiln and an adjustable outlet 18, regulates the amount of re-cycling of kiln air. Upper end of duct member 17, is provided with deflector members 19, which serve to pass re-cycled air over heater elements 11.

Numeral 20, indicates a reservoir for fluid to be heated and re-cycled and 21, indicates an immersion electric heater element. Conduits 22, connect the system in a closed circuit arrangement in conjunction with cistern 23.

A first essential factor in this form of the invention is the provision of a closed circuit heating system which allows the kiln to be fully portable and self-contained. The fluids which may be used in the system include water and oils. Water is generally used where temperatures in the order of 100° C. are required, and oils are used for higher ranges of temperatures. A second essential factor is the aerodynamics of the duct 8, which affords virtual elimination of static regain.

Figure 3:
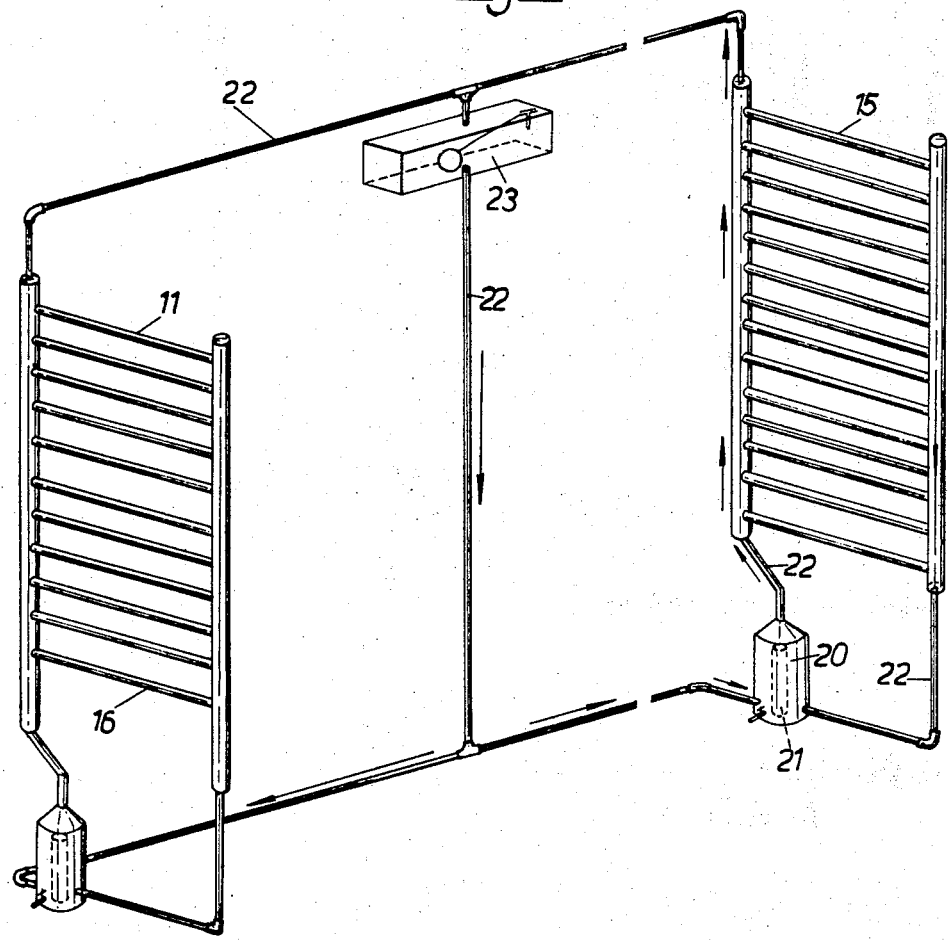
FIG. 3 illustrates a schematic diagram of the heat source.

FIG. 3, sets out schematically one method for setting up the closed circuit heating system.

Figure 4:
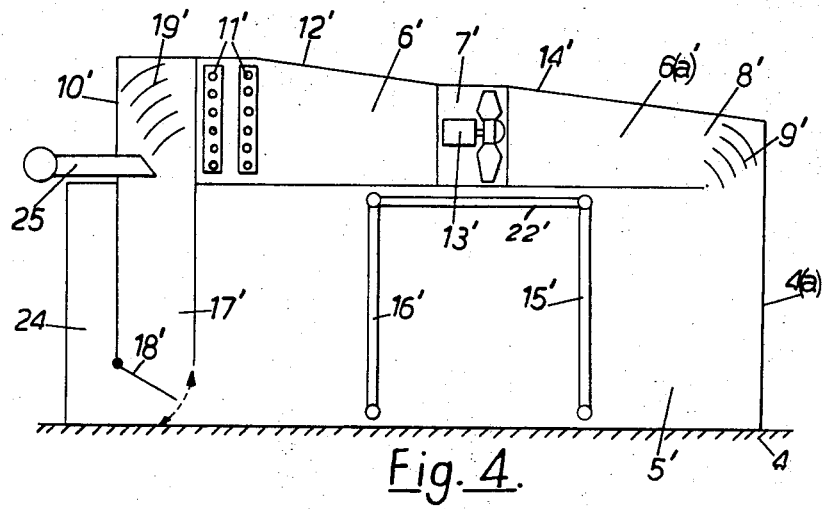
FIG. 4 illustrates a side elevation of a modified "Torry" type kiln.

Referring now to FIG. 4: a modified "Torry" type kiln is illustrated which embodies the novel features of closed circuit heating and duct design to eliminate or reduce static regain. Numeral 24, denotes a chimney and 25, denotes smoke pipes for introducing smoke into the kiln for treatment of the food or other products being dried.

Figure 5:
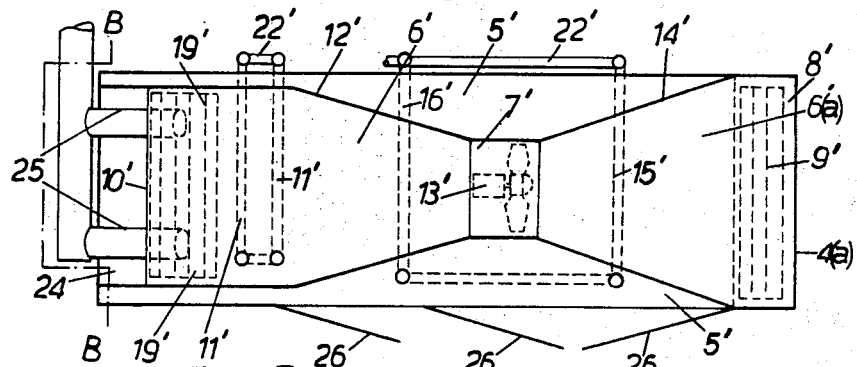
FIG. 5 illustrates a plan view of a modified "Torry" type kiln.

FIG. 5, illustrates a plan view of the modified "Torry" type kiln and numeral 26, denotes access doors provided in a side of the wall 4(a), of the kiln.

Figure 6:
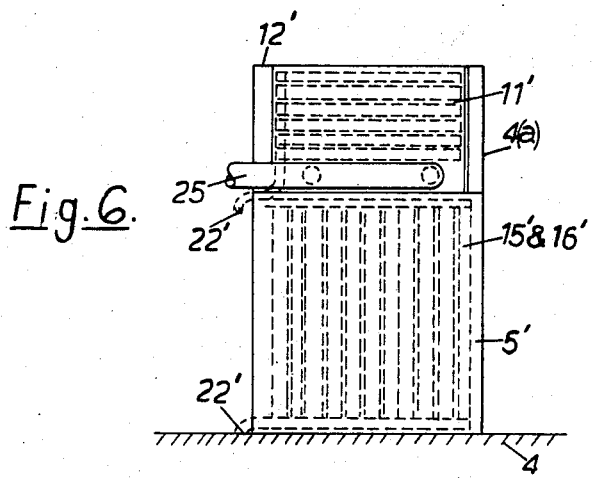
FIG. 6 illustrates an end section of a modified "Torry" type kiln.

FIG. 6, illustrates a sectional view along line B—B of FIG. 5, and shows the layout of the heater elements in this type of kiln.

It will be observed from the drawings that the heating chambers 6′ and 6′(a), are of a particular shape which allows for relatively slow intake of ambient air. This affords the maximum possible time for the air to be heated when passing over heat elements 11′. Thereafter chamber 6′, takes on the shape of the inlet throat to a venturi which has fan 13′, positioned at its most constricted point. This constriction speeds up the passage of heated air from the elements 11′, to chamber 6′(a) and drying chamber 5′, so that heat loss is minimised.

The airstream enters chamber 6′(a) which takes the form of a half-venturi so that a constant velocity constant pressure airstream results. An airstream divider 9′, ensures so far as possible, that an even airstream enters drying chamber 5′, and passes along this chamber to re-cycle duct 17′, and/or chimney 24.

Essential features of this form of the invention include the aerodynamics of the heating chambers 6′ and 6′ (a), and the closed circuit system for providing heat in elements 11, 15′ and 16′. By designing the "Torry" type kiln in this way, its overall size can be reduced from that customarily employed, to an extent where the kiln may literally be portable.

In FIGS. 4, 5 and 6, 10′ indicates the location of the adjustable inlet and 18′ the outlet. The fan duct is indicated at 7′ and 14′ indicates the duct of chamber 6′(a) leading to duct 8′ which leads to the drying chamber 5′. Deflector members are shown at 19′ and 9′ while 22′ indicates the conduits for the closed circuit arrangement.

Portability is of particular utility in underdeveloped countries of the world where, for example, the drying of fish caught in remote lakes and dams presents a problem. A cheap portable kiln designed in accordance with this invention will solve this problem, resulting in greater output of satisfactorily dried and preserved fish, as well as minimising losses presently experienced due to inadequate preparation.

In one embodiment of the invention, a kiln of the kind in question can be built onto its own trailer unit, and the heater elements and fan may be driven by an auxiliary motor-generator assembly incorporated onto the trailer. It will be appreciated that a unit of this nature can readily be towed to a particular site and conveniently removed to another site when the supply of raw material has been exhausted.

In another portable version of the kiln, heater elements 11, 15′ and 16′, are supplied with heated fluid, for example water, from a reservoir fitted with an immersion heater. If temperatures above about 100° C. are required, heated oil may be used in place of water or the water may be subjected to pressure in the system.

It is apparent that a novelly improved portable and completely self-contained kiln has been evolved which achieves the objectives and advantages stated throughout the specification.

I claim:

1. A self-contained portable kiln for reducing moisture content of materials comprising a three-dimensional body including wall means forming a first upper chamber and a second lower chamber; said upper chamber having an inlet for receiving ambient air, a first heat exchanger disposed adjacent said inlet; a fan in said upper chamber to draw air over said heat exchanger element and discharge heated air into said lower chamber; a second heat exchanger in said lower chamber; re-cycle air duct means connecting said lower chamber to said upper chamber, said latter means including a duct leading from a position downstream in said lower chamber to a position upstream in said upper chamber relative to the heat exchangers in each chamber; a damper regulating the flow of air via said duct, said lower chamber having an outlet with means for at least part of the air to be selectively discharged exteriorly of said kiln to atmosphere air which is not re-cycled; access doors in said lower chamber to allow charging of the kiln with materials to be dried and removal from the kiln of the dried product; said heat exchangers in each chamber forming part of a closed tubular circuit heated fluid system which system further comprises a supply cistern of fluid, and a fluid reservoir means adjacent each heat exchanger for fluid to be heated; a source of heat associated with said reservoir means and including immersion type heaters in said reservoir means for inducing flow for re-cycling heated fluid in said system.

2. A portable kiln as set forth in claim 1 wherein at least one of said heat exchangers comprises a single series of coplanar horizontal spaced heating elements interconnecting vertical coplanar header elements in predetermined ladder formation; and said upper chamber comprises a first and second portion in general coaxial alignment, said first portion including said inlet, said first heat exchanger and a venturi type duct portion leading to said fan; said second portion comprising a half-venturi type duct leading from said fan to said recycle air duct means and to said lower chamber to ensure a substantially constant velocity, constant pressure airflow through said kiln.

References Cited

UNITED STATES PATENTS

| | | | |
|---|---|---|---|
| 1,610,147 | 12/1926 | Park | 34—196X |
| 336,511 | 2/1886 | Curran | 34—216 |

FOREIGN PATENTS

| | | | |
|---|---|---|---|
| 1,050,034 | 8/1953 | France | 34—155 |
| 254,004 | 11/1912 | Germany | 34—219 |
| 1,159,353 | 12/1963 | Germany | 34—219 |
| 442,732 | 11/1948 | Italy | 34—91 |
| 457,579 | 5/1950 | Italy | 34—212 |

FREDERICK L. MATTESON, JR., Primary Examiner

H. B. RAMEY, Assistant Examiner